United States Patent [19]

Blank

[11] 3,960,983

[45] June 1, 1976

[54] COMPOSITION OF MATTER COMPRISING A BLEND OF A POLYETHER POLYOL AND AN AMINOPLAST CROSS-LINKING AGENT

[75] Inventor: Werner Josef Blank, Wilton, Conn.

[73] Assignee: American Cyanamid Company, Stamford, Conn.

[22] Filed: Dec. 6, 1974

[21] Appl. No.: 530,459

Related U.S. Application Data

[63] Continuation-in-part of Ser. No. 331,406, Feb. 12, 1973, abandoned.

[52] U.S. Cl............................... 260/839; 260/29.3; 260/29.4 R; 260/33.2 R; 260/849; 260/840; 260/67.6 R; 260/71; 427/388; 428/460; 428/463

[51] Int. Cl.².......................................... C08L 61/28

[58] Field of Search.......... 260/849, 33.4 R, 33.2 R, 260/67.6 R, 71, 839, 840, 29.3, 29.4 R

[56] References Cited

UNITED STATES PATENTS

| | | | |
|---|---|---|---|
| 3,267,174 | 8/1966 | Fry et al. ............................ | 260/851 |
| 3,542,718 | 11/1970 | Davis et al. ......................... | 260/849 |
| 3,652,583 | 3/1972 | Tajima et al. ....................... | 260/849 |
| 3,776,879 | 12/1973 | Blank................................. | 260/29.4 |
| 3,804,920 | 4/1974 | Cunningham et al............... | 260/850 |

*Primary Examiner*—John C. Bleutge
*Attorney, Agent, or Firm*—James T. Dunn

[57] ABSTRACT

The disclosure relates to a composition of matter comprising blends of certain polyether polyols with a class of compatible aminoplast cross-linking agents and the use of such compositions with or without diluents.

15 Claims, No Drawings

COMPOSITION OF MATTER COMPRISING A BLEND OF A POLYETHER POLYOL AND AN AMINOPLAST CROSS-LINKING AGENT

REFERENCE TO RELATED APPLICATIONS

This application is a continuation-in-part of my earlier application Ser. No. 331,406 filed Feb. 12, 1973, now abandoned.

BACKGROUND OF THE INVENTION

Blends of resinous materials have been manufactured and sold for a substantial plurality of years. These compositions of matter are generally composed of linear polymeric materials which have the capacity of being cross-linked and can be converted to the cross-linked state by use of a selected cross-linking agent.

THE FIELD OF THE INVENTION

The present invention is in the field of polymeric materials that are particularly useful in the coating fields as well as in the manufacture of low pressure laminates, adhesives, molding compounds and textile treating resins. The compositions of the present invention can be used to apply a coating to the surface of existing paper webs from dispersions or solutions of the composition of the present invention. These blends can also be utilized to impregnate paper sheets for use in the manufacture of decorative laminates.

DESCRIPTION OF THE PRIOR ART

The most pertinent prior art references known to the applicant are U.S. Pat. Nos. 3,565,846; 3,595,813; 3,626,023; 3,652,583 and 3,776,879 all of which patents are incorporated herein by reference.

SUMMARY OF THE INVENTION

A composition of matter comprising a blend of (A), from about 10% to about 90%, by weight, of a water dilutable, polyether polyol resin having an average molecular weight between about 250 and about 2,000, having at least two alcoholic hydroxy groups, having from about 80% to about 20%, by weight, of hydrophobic moieties derived at least in part from aromatic and cycloaliphatic materials and correspondingly from about 20% to about 80%, by weight, of hydrophilic moieties consisting of —(CH$_2$CH$_2$—O—) units, and (B), correspondingly from about 90% to about 10%, by weight, of a compatible aminoplast cross-linking agent having an average molecular weight not greater than about 1,000.

DESCRIPTION OF THE PREFERRED EMBODIMENTS

The compositions of the present invention are composed of two (2) essential components. The first component is a water dilutable polyether polyol resin having at least two (2) alcoholic hydroxy groups and having a plurality of hydrophobic moieties and a plurality of hydrophilic moieties. These polyols may be prepared for instance by reacting a compound containing a plurality of hydroxy groups with an alkylene oxide. These compounds containing a plurality of hydroxy groups may be aromatic or cycloaliphatic materials. These polyhydric compounds may be monomeric or part of a low molecular weight polymer chain such as a polymer of phenol-formaldehyde reaction product many of which are well known such as the Novolak resin type.

Among the monomeric compounds that can be used to make the polyether polyol resin used in the present invention are the bisphenol compounds such as bisphenol A which is identified as 4,4'-isopropylidene diphenol which is also known as 4,4'-dihydroxydiphenyldimethylmethane. Another bisphenol is identified as bisphenol F which is 4,4'-methylene diphenol which is also known as 4,4'-dihydroxydiphenylmethane. Other polyhydric phenols which can be used in preparing the water-dilutable polyether polyol resins used in the present invention are the dihydric phenols represented by the general formula:

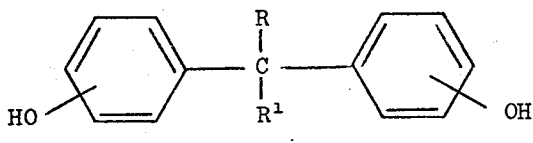

wherein the phenolic hydroxy groups may be in one of the 2,2'; 2,3'; 2,4'; 3,3'; 3,4'; or 4,4' positions on the aromatic nuclei, and each of R and R$^1$ represent hydrogen, an alkyl group, such as methyl, ethyl, propyl, isopropyl, butyl, sec-butyl, pentyl, isopentyl, hexyl, isohexyl, and the like; a cyclo(lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the aromatic rings may have other substituents besides the hydroxyl group, for example, lower alkyl groups containing from 1 to 4 carbon atoms, i.e., methyl, ethyl, propyl, isopropyl, butyl, sec-butyl and tert.-butyl groups, halogen atoms, i.e., fluorine, chlorine, bromine or iodine and the like.

An illustrative but, by no means exhaustive listing of dihydric phenols falling within this general formula includes 4,4'-dihydroxydiphenyldimethylmethane (bisphenol A), 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane, and the like.

Among the alkylene oxides that may be reacted with the polyhydric compounds such as those set forth hereinabove are ethylene oxide, propylene oxide, butylene oxide and olefine oxides with a chain length of C$_5$–C$_{18}$, styrene oxide, 4-oxatetracyclo-[6.2.1.0$^{2,7}$,0$^{3,5}$] undecan-9(10)-ol and similar mono epoxy compounds derived from aliphatic, cycloaliphatic and aromatic hydrocarbons. With the exception of ethylene oxide all other alkylene oxide compounds impart hydrophobic moieties to the polyol. The ethylene oxide will impart —(CH$_2$CH$_2$—O—) units to the polyol.

The amount of the polyether polyol resin that is used with the cross-linking agent, may vary between 10% to about 90%, by weight, based on the total weight of the two components. This means that there will be used with the polyol resins a corresponding amount of from about 90% to about 10%, by weight, of a compatible aminoplast cross-linking agent wherein the percentages of these two components total 100%, by weight. It is preferred to use between about 40% to about 80%, by weight, of the polyol resin and correspondingly from about 60% to about 20%, by weight, of the cross-linking agent. These polyols can be used either singly or in combination with one another. However, in either case, the weight proportions remain the same.

The water-dilutable polyether polyol resins used in the present invention may be normally liquid, i.e. liquid at atmospheric pressure and at about room temperature, i.e. about 20°–25°C. However, since the aminoplast cross-linking agents used in the compositions of the present invention are in some instances solids and in other instances liquid, use of normally solid water-dilutable polyether polyol resins can be made since they can be dissolved or dispersed in the compatible aminoplast cross-linking agent. Additionally, normally solid water-dilutable polyether polyol resins that have a softening or melting point of 30°C., 40°C., 50°C. and higher may be warmed to their melting point and a solid compatible aminoplast cross-linking agent may be dissolved therein and upon cooling to room temperature the mixture remains liquid. Additionally, these same normally solid polyol resins may be heated to their melting temperature and a normally liquid compatible aminoplast cross-linking agent may be dispersed therein with thorough mixing and upon cooling to room temperature, the mixture remains liquid. Still further these normally solid polyol resins may be diluted with a small quantity of water, since they are water dilutable, to form a high solids solution of the polyol in water which solution may then be blended with a solid or a liquid compatible aminoplast cross-linking agent of the class described herein. Still further, one could take a normally solid water-dilutable polyether polyol resin and a normally solid compatible aminoplast cross-linking agent and the two solids can be physically mixed to form an eutectic mixture which remains liquid at room temperature.

The compositions of the present invention are particularly useful as coating compositions and are outstandingly attractive for this purpose since they can be used without any solvent whatever, particularly without any organic solvent, which organic solvent, when used, may tend to pollute the atmosphere upon the evaporation of the solvent from the coating. When applied as an undiluted coating to a substrate such as iron phosphated steel panel by spraying and thereafter baking, the two essential components react with one another to form a thermoset or cross-linked coating on the substrate. Because each of these components are frequently water soluble and almost invariably water dispersible, these compositions can be diluted with water, if desired, to any selected solids content. Not all polyols of this invention are completely water miscible at every solids content. It is in most applications only necessary to add a certain amount of water to the polyol to achieve a certain application viscosity. The person skilled in the art will select a polyol water reducible only to the solids content required for the application. By selecting a not too hydrophilic polyol for a given application, the best water resistance of the cured film after baking can be obtained. If a clear coating is desired, the blend of the two essential components can be used directly on the substrate. However, pigmented coatings can be prepared by the use of conventional commercially available pigments such as titanium dioxide, iron oxide red pigment and the like. These compositions are useful as coating compositions for metal, wood, plastic, textiles, paper, glass and the like. These compositions can be applied by spraying, dipping, roller coating or brushing techniques.

One of the advantages of the present invention, where a solvent based system is used, is that very high application solids can be achieved. Also it is obvious that lower molecular weight resins can be applied at a higher solids. It is normally assumed, because of its higher cross-linking tendency, that such a coating will show poor film performance. The novel coatings made from the compositions of the present invention surprisingly can result in extremely hard and mar resistant coatings which are very flexible.

The aminoplast cross-linking agents used in the present invention may be either alkylated or unalkylated. They should be alkylated when used in coating compositions but for other uses such as in laminating operations, adhesives and molding compositions among others, they are preferably unalkylated.

The alkylated aminoplast cross-linking agents can be prepared by reacting a urea with an aldehyde such as formaldehyde and then alkylating said urea-formaldehyde reaction product with a lower alkanol such as methanol, ethanol, propanol or butanol. In addition to urea per se, one could make use of ethyleneurea, thiourea and the like. Additionally, one can make use of the aminotriazine aldehyde reaction products that have also been alkylated with comparable alkanols. In this connection, attention is directed to the U.S. Pat. No. 2,197,357 which shows a substantial plurality of aminotriazines reacted with aldehydes that are then alkylated by reaction with a substantial plurality of compounds containing an alcoholic hydroxy group. The above mentioned U.S. patent is incorporated herein by reference to avoid unnecessary redundancy. The said patent discloses a plurality of guanamines such as formoguanamine and acetoguanamine which can be used to form compatible alkylated aminoplast cross-linking agents. These cross-linking agents can be, and preferably are monomeric. Illustrative of such a monomeric aminoplast cross-linking agent is the hexakis(methoxymethyl)melamine. This monomeric compound can be prepared by a plurality of different processes such as those shown in the U.S. Pat. Nos. 2,918,452; 2,998,410 and 2,998,411 all of which patents are incorporated herein by reference. Unmixed ethers of the polymethylol triazines can be used as well as mixed ethers such as the tetrakis(alkoxymethyl)benzoguanamines may be used which are disclosed in the U.S. Pat. No. 3,091,612 which patent is incorporated herein by reference. Mixed ethers of other triazines are disclosed in the U.S. Pat. No. 2,454,495 which is also incorporated herein by reference. A lengthy dissertation on fully mixed ethers of hexamethylol melamine is set forth in the U.S. Pat. No. 3,471,388 which patent is also incorporated herein by reference so as to avoid redundancy. The unalkylated melamine resins are shown in U.S. Pat. No. 2,260,239.

In addition to the urea family and the triazine family of alkylated aminoplast cross-linking agents, one may also use the aniline-formaldehyde reaction products, a plurality of which are available commercially. These aniline reaction products should be limited to use in those compositions in which darker colors are not objectionable.

In addition to using these cross-linking agents in the monomeric state, one may use low polymers of these reaction products such as dimer, trimer, tetramers and the like. It is generally preferred to utilize a cross-linking agent that has an average molecular weight not greater than about 1,000.

If water dilutability of these cross-linking agents is desired, methanol is preferably used as the alkylating agent. These aminoplast cross-linking agents may be used either singly or in combination with one another. In either case, the weight proportions remain the same.

It has been indicated hereinabove that the compositions of the present invention make novel coating systems which result in extremely hard and mar resistant coatings which are nevertheless very flexible. It is possible on the other hand to formulate soft and rubbery coatings which are similar in appearance to vinyl organosol coatings. When the selected polyether polyol resins and the compatible alkylated aminoplast cross-linking agents are used, stable water dilutable systems can be formulated which give a performance equal to or better than existing water-soluble and solvent based substances. Compared to normal water based coatings, the aqueous coating systems of the present invention can be applied at a solids content of 70–90% whereas the normal application solids of an acrylic water based coating or a polyester resin water based coating are about 40–50%. Anionic water based coatings normally require an amine and an organic cosolvent in order to achieve water solubility or dispersibility. The coatings prepared from the compositions of the present invention do not require an amine or a cosolvent to achieve water compatibility. Since only small amounts of water have to be used in the coating compositions of the present invention, it is unnecessary to use any flash off time before baking. On the other hand, the conventional water based coatings cannot be applied without considerable difficulty at a film thickness greater than about 1.5 mils without displaying a significant degree of blistering. The novel coatings of the present invention have been applied at a film thickness of 3 to 5 mils without blistering. Certain high solids solvent based coatings have displayed a tendency to show tears if applied by spray application. The novel high solids coatings of the present invention on the other hand can be applied at a very low spray viscosity and the films deposited do not sag or show tears. With normal water soluble coating systems, it is difficult to obtain paint stability. The novel coatings of the present invention have displayed excellent paint stability over long periods of time without impairment in performance.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims. These polyethers are made by the methods shown, with the reactants indicated and have the properties listed hereinbelow.

Polyether A is prepared by reacting 1 mole of bisphenol F (4,4'-methylene diphenol) with 2 moles of propylene oxide. The reaction product thus produced is then reacted with 7 moles of ethylene oxide. The resulting product has a viscosity of 1650 centipoises and a hydroxyl number of 225. The molecular weight of the product is about 500. This polyether contains about 49% hydrophilic moieties and about 51% hydrophobic moieties. Polyether A is a liquid.

Polyether B is prepared by reacting 3 moles of phenol under acidic conditions with 2 moles of formaldehyde. The resulting product is then reacted with 9 moles of ethylene oxide. The resulting polyether has a viscosity of 11,700 centipoises, a hydroxyl number of 244 and a functionality of 3. Polyether B has a molecular weight of about 680. This polyether contains about 56% hydrophilic moieties and about 44% hydrophobic moieties. Polyether B is a liquid Polyether C is prepared by reacting 1 mole of the phenol-formaldehyde reaction product of Polyether B in sequence with 3 moles of ethylene oxide and then with 3 moles of propylene oxide. The resulting polyether has a viscosity of 132,000 centipoises and a hydroxyl number of 291. The molecular weight is about 570. This polyether contains about 22% hydrophilic moieties and about 78% hydrophobic moieties Polyether D is prepared by reacting 1 mole of bisphenol A (4,4'-isopropylidene diphenol) with 6 moles of ethylene oxide. The resulting product has a viscosity of 2,840 centipoises and a hydroxyl number of 215. The molecular weight of Polyether D is about 520. This polyether contains about 54% hydrophilic moieties and about 46% hydrophobic moieties. Polyethers C and D are liquids.

Polyether E is prepared by reacting 1 mole of hydrogenated bisphenol A with 10 moles of ethylene oxide. The product has a molecular weight of 601, an hydroxyl number of 158 and is a solid. The polyether contains about 65% hydrophilic moieties and 35% hydrophobic moieties.

Polyether F is prepared by reacting 1 mole of bisphenol A with 10 moles of ethylene oxide to produce a liquid product having a molecular weight of 679. The hydroxyl number is 154. Polyether F contains about 66% of hydrophilic groups and 34% of hydrophobic groups.

Polyether G is prepared by reacting 1 mole of bisphenol A with about 21 moles of ethylene oxide to produce a waxy solid having a molecular weight of about 1150 and an hydroxyl number of 98. The polyether contains about 80% of hydrophilic groups and about 20% of hydrophobic groups. This polyether is soluble in water.

Polyether H is prepared by reacting 1 mole of Polyether E with 12.5 moles of ethylene oxide to produce a hard waxy solid having a molecular weight of 1300, an hydroxyl number of 88, and contains about 80% of hydrophilic ethylene oxide moieties and about 20% hydrophobic moieties.

EXAMPLE 1

100 parts, by weight, of Polyether A are blended with 25 parts of 20% amine neutralized aqueous solution of a commercially available rosin-maleic anhydride adduct, having an acid number of 240, and 100 parts of a rutile titanium dioxide pigment. The titanium dioxide pigment is dispersed under high speed agitation in the polyether. The pigment paste is blended with 100 parts of a methylated urea-formaldehyde resin with a combined U/F/Me mol content of ½.4/1.9 respectively (M.W. about 300. Added to this mixture are 1 part dimethylaminoethanol 0.4 part phosphoric acid, 85%, 10 parts of 10% aqueous solution of an acrylic terpolymer (terpolymer consists of 55% butyl acrylate, 30% styrene, and 15% acrylic acid) with an acid number of 110, and 140 parts of deionized water. The resulting spray system has a viscosity of 22 seconds Ford 4 cup at a solids of 71%. Iron phosphated steel panels are sprayed with this paint and then baked for 20 min. at 150°C. The resulting film has the following characteristics:

| Film thickness, mil | 1.2 |
| --- | --- |
| Knoop hardness | 14 |
| Reverse impact inch, lbs. | >80 |
| Gloss 60° | 94 |
| Gloss 20° | 81 |
| Pencil hardness | H-2H |

EXAMPLE 2

Example 1 is repeated in all essential details except that 100 parts of Polyether B is used in the place of 100 parts of Polyether A. The amount of water is reduced to 40 parts and 0.1 part of a nonionic silicone surfactant is added. This paint formulation is drawn down on iron phosphated steel at a film thickness of 1.5 mil wet. The application solids is 85%. After a baking cycle of 20 minutes at 150°C. the film shows the following characteristics:

| Film thickness, mil | 0.7 |
| --- | --- |
| Knoop hardness | 19 |
| Pencil hardness | 4H-5H |
| Gloss 60° | 97 |
| Gloss 20° | 75 |
| Reverse Impact | 30 inch/lb. |

EXAMPLE 3

Example 2 is repeated in all essential details except that 100 parts of Polyether C is used in the place of Polyether B. The amount of water in the formulation is reduced to 20 parts. Films are drawn on iron phosphated steel. The application solids is 90%. After baking cycles of 20 minutes at 150°C. and 10 minutes at 175°C. the panels show the following film characteristics:

| Film thickness | 0.8 |
| --- | --- |
| Knoop hardness | 17.2 |
| Gloss 60° | 96 |
| Gloss 20° | 87 |
| Reverse impact | 20 inch/lbs. |
| Water resistance 70°C., 30 min. | Excellent |

The formulations of Examples 1, 2 and 3 were aged for 3 weeks at 55°C., with the exception of a slight decrease in pH, the formulations did not show any change in performance.

EXAMPLE 4

70 parts by weight of Polyether A are blended with 12 parts of a 20% amine neutralized aqueous solution of a commercially available rosin-maleic anhydride adduct, having an acid number of 240, and 80 parts of a titanium dioxide rutile pigment. The pigment is dispersed on a high speed disperser for 30 minutes. The resulting pigment paste is blended with 30 parts of hexakis(methoxymethyl)melamine, 0.5 part dimethylaminoethanol, 5 parts of a 10% amine neutralized aqueous solution of an acrylic terpolymer, (terpolymer — 55% butyl acrylate, 30% styrene, 15% acrylic acid), 3 parts of a 20% solution of p-toluenesulfonic acid in isopropanol and 10 parts water. The paint has a solids content of 85%. The formulation is drawn down onto iron phosphated steel panels and baked for 20 minutes at 150°C.

Test results:

| Film thickness, mil | 0.9 |
| --- | --- |
| Knoop hardness | 10 |
| Gloss 60° | 87 |
| Gloss 20° | 54 |
| Reverse Impact, inch lbs. | 60 |
| Water resistance, 70°C., 30 minutes | Excellent |
| Salt spray resistance, 144 hours | Excellent |

EXAMPLE 5

45 parts, by weight, of Polyether A are blended with 12 parts of 20% amine neutralized aqueous solution of a commercially available maleinized rosin, having an acid number of 240, and 80 parts of an iron oxide red pigment. The mixture is dispersed on a three roll mill. Added to the blend are 55 parts of an 80% solution of a partially methylated polymeric melamine formaldehyde resin (M.W. about 800) in isobutanol, 0.5 part dimethylaminoethanol and 5 parts of a 10% aqueous solution of an acrylic terpolymer, (terpolymer — 55% butyl acrylate, 30% styrene, 15% acrylic acid). The paint has a solids content of 87.7%.

Test results:

| Film thickness, mil | 1.2 |
| --- | --- |
| Knoop hardness | 5 |
| Reverse impact, inch/lbs. | 50–60 |
| Gloss 60° | 97 |
| Gloss 20° | 85 |
| Water resistance, 70°C., 30 minutes | Excellent |

EXAMPLE 6

50 parts, by weight, of Polyether A are blended with 10 parts of a 20% amine neutralized aqueous commercially available maleinized rosin having an acid number of 240 solution and 80 parts of titanium dioxide rutile pigment. The paste is ground on three roll mill and the following ingredients are added under high speed agitation: 35 parts of a methylated urea-formaldehyde resin (M.W. about 300) with a urea/formaldehyde/methanol, mol ratio of ½.4/1.9 respectively, 15 part of hexakis(methoxymethyl)melamine. 1 part dimethylaminoethanol, 5 parts of a 10% aqueous solution of an acrylic terpolymer (55% butyl acrylate, 30% styrene, 15% acrylic acid) 1 part of a 20% solution of p-toluenesulfonic acid in isopropanol and 0.1 part of a nonionic silicone surfactant. The above mixture is diluted with 70 parts of water to a solids of 68.4% and a Ford 4 Cup viscosity of 20 seconds. Iron phosphated panels are sprayed with the paint using an air pressure of 80 p.s.i. The panels are baked 20 minutes at 150°C. or 10 minutes at 175°C.

Test results:

| Film thickness, mil | 0.8 |
| --- | --- |
| Knoop Hardness | 11 |
| Reverse impact resistance inch lbs. | >80 |
| Gloss 60° | 100 |
| Gloss 20° | 87 |

EXAMPLE 7

(Comparative example of commercial water based system)

186 parts, by weight, of a titanium dioxide rutile pigment are blended with 124 parts of a 75% solution of an acrylic terpolymer (55% butyl acrylate, 30% styrene, 15% acrylic acid) in n-butanol. The mixture is ground on a three roll mill. To the blend, 19 parts of dimethylaminoethanol, 124 additional parts of the 75% solution of the aforementioned acrylic terpolymer, 46 parts of hexakis(methoxymethyl)melamine, (methoxymethyl)melamine, and 2.3 parts of a 20% solution of p-toluenesulfonic acid are added. The viscous solution is diluted to 40–42% solids with deionized water. Panels sprayed at the above solids and 70 seconds Ford 4 Cup viscosity, were baked 20 minutes at 175°C. The appearance of the panels was good.

| Test Results: | |
|---|---|
| Film thickness, mil | 1.2 |
| Gloss 60° | 87 |
| Gloss 20° | 83 |
| Knoop hardness | 10.5 |
| Reverse impact, inch lbs. | 0–10 |

Panels prepared from this paint after being aged for 1 week at 55°C. showed a substantial decrease in gloss. The viscosity decreased to 20 seconds Ford 4 Cup.

Compared to the high solids systems of this invention this conventional water based system contains large levels of cosolvent and amine, which from the standpoint of toxicity and safety of handling is an undesirable feature. Based on the binder, Example 7 contains 33% organic solvent and 10% amine. It is not feasibly possible to apply this system (Example 7) at a solids higher than about 42%. The large amounts of water in the formulation require higher baking temperatures or longer baking cycles, than a comparable high solids system. The large amounts of water in the standard water based formulation restrict the film thickness obtainable without flash off time. Under comparable conditions the high solids system of the present invention can be applied at film thickness of 3 mils or higher versus a maximum film thickness of 1.2–1.5 mils for the standard water based system.

EXAMPLE 8

(Comparative example of a commercial water based system)

100 Parts of an 80% solution of a water dilutable polyester resin, a polyester resin comprising the reaction product of phthalic anhydride, adipic acid, dimethylol propionic acid and neopentyl glycol having an acid number of 70, in 2-butoxyethanol are blended with 100 parts of hexakis(methoxymethyl)melamine and 100 parts of titanium dioxide pigment are dispersed in the blend. After addition of 8.8 parts of dimethylaminoethanol and 1 part of a 20% solution of p-toluenesulfonic acid, 200 parts of water are added. Films are drawn down on iron phosphated steel panels and baked for 20 minutes at 175°C.

| Test results: | |
|---|---|
| Film thickness | 1.0 |
| Gloss 60° | 90 |
| Gloss 20° | 78 |
| Knoop hardness | 7.9 |
| Reverse impact, inch lbs. | 60 |
| Water resistance, 70°C., 30 min. | Excellent |

The application solids was only 47%. No application at higher solids was feasibly possible. The paint was aged for 10 days at 55°C. Panels prepared after the aging time showed good appearance, but the coating was soft and showed poor resistance properties.

EXAMPLE 9

(Comparative example, solvent based alkyd/urea system)

116 Parts, by weight, of a titanium dioxide rutile pigment are blended with 77.7 parts of a commercially available 50% short oil alkyd resin solution in xylene. The mixture is dispersed on a 3 roll mill and blended with 124.8 parts of the remaining alkyd solution, 28.6 parts of a methylated urea-formaldehyde resin (M.W. about 300) with a U/F.Me mole ratio of ½.4/1.9 respectively, 29 parts xylene and 23 parts of n-butanol. This paint formulation has a solids of 61.6% at a viscosity of 60 seconds Ford 4 Cup. For spray application this formulation is further diluted to 20 seconds Ford 4 Cup and a solids of 51%. Iron phosphated steel panels sprayed with this formulation and baked 20 minutes at 300°F. have good appearance.

| Test results: | |
|---|---|
| Film thickness, mil | 1.2 |
| Knoop hardness | 3.5 |
| Gloss 60° | 85 |
| Gloss 20° | 78 |
| Pencil hardness | HB-F |
| Reverse Impact inch lbs. | 10 |

This conventional solvent based alkyd urea system shows low application solids, 50% versus 70–90% of the high solids system of this invention. The film is softer, has lower gloss and poor impact resistance. The paint aged at 55°C. for 2 weeks shows an 80% increase in viscosity, indicating instability.

EXAMPLE 10

50 Parts, by weight, of Polyether D are blended with 62.5 parts of an 80% aqueous solution of a partially methylated melamine-formaldehyde resin, (M.W. about 411) having a combined melamine/formaldehyde/methanol mol ratio of ⅓.5/2.0 respectively. The mixture is diluted to 75% solids with deionized water. Cold rolled steel panels are dipped in this mixture and after a flash off time of 10 minutes, baked at 150°C. for 20 minutes. The resulting coating has the following characteristics:

| | |
|---|---|
| Film thickness, mil | 0.5–1.2 |
| Appearance (unpigmented film) | Clear |
| Reverse Impact, inch lbs. | >140 |
| Knoop hardness | 12 |
| Pencil Hardness | H-2H |
| Water Resistance, 100°C. 30 min. | Excellent |

EXAMPLE 11

30 Parts, by weight, of polyether B are blended with 15 parts of a phthalocyanine blue pigment. The paste is ground on a three roll mill. The resulting mix is let down with 70 parts of Polyether B and 120 parts of a partially methylated urea formaldehyde resin (M.W. about 300) solution in isopropanol. Said urea resin solution has a solids content of 88% and a combined urea/formaldehyde/methanol mole ratio of ½.4/1.6 respectively. The mixture is drawn down onto aluminum panels and baked 20 minutes at 150°C.

| Test results: | |
|---|---|
| Film thickness, mil | 0.9 |
| Knopp Hardness | 12 |
| Pencil Hardness | 2H-3H |
| Reverse Impact, inch lbs. | 30 |
| Gloss 60° | 85 |
| Gloss 20° | 50 |

EXAMPLE 12

50 Parts, by weight, of Polyether B are blended with 50 parts of a 100% solids low viscosity butylated urea formaldehyde resin (M.W. about 600) having a U/F/Bu mole ratio of 1:2.4:1.1, respectively. To this mixture there is added 5 parts of an amine neutralized 20% aqueous solution of a maleic anhydride-rosin adduct and 80 parts of titanium dioxide. This blend is ground in a 3-roll mill. After dilution with 10 parts of water, the paint is drawn down onto iron-phosphated cold rolled steel panels and baked for 20 minutes at 150°C. The films produced had the following properties.

| Test results: | |
|---|---|
| Film Thickness, mil | 0.8 |
| Knoop Hardness | 7.0 |
| Reverse Impact, inch lbs | >80 |
| Gloss 60° | 89 |
| Gloss 20° | 70 |

EXAMPLE 13

A mixture of 35 parts of Polyether E, 15 parts of a substantially fully methylated, substantially fully methylolated melamine composition (M.W. about 600), 0.4 part of p-toluene sulfonic acid, 0.2 part of dimethylethanolamine and 1.0 part of water are thoroughly blended to form a coating composition. Films are drawn down on Bonderite 1000 steel sheet in a film thickness of 1.2–1.5 mils and are baked at 150°C. for 20 minutes. The resultant film had a pencil hardness of 2B–3B, reverse impact resistance of 40–50 inch-pounds, methyl ethyl ketone rub resistance greater than 200 and on cross-hatch had a 40% loss of adhesion. When subjected to hot water at 71°C. for 30 minutes, no blisters or softening of the film were evident.

EXAMPLE 14

Example 13 is repeated in all essential details except that in the place of Polyether E, there is substituted 35 parts of Polyether F. Films were drawn down and baked as in Example 13. The baked film had a pencil hardness of HB-F, a reverse impact resistance of 40–50 inch-pounds, a methyl ethyl ketone rub resistance greater than 200 and on a cross-hatch test, there was 30% loss of adhesion. When subjected to hot water at 71°C. for 30 minutes, no blisters or softening of the film were evident.

EXAMPLE 15

A mixture is prepared of 20 parts of Polyether G, 20 parts of melamine-formaldehyde partially methylated low molecular weight material (M.W. about 800) having a mole ratio of about $M_1F_5Me$ 3.5 respectively on average, 0.4 part of p-toluene sulfonic acid, 0.1 part of dimethylethanolamine, 2.0 parts of water, to provide a 89% solids solution. Films were drawn down on Bonderite 1000 sheet steel panels in a 1.0 mil thickness. The first panel was baked at 150°C. for 20 minutes and displayed a pencil hardness of B-BH, a reverse impact resistance of 30–40 inch-pounds, a methyl ethyl ketone rub resistance in excess of 200 and a cross-hatch adhesion loss of 5–10%. When immersed in water at 71°C. for 30 minutes microblisters were observed and pencil hardness was 2B–3B.

A second panel was baked at 175°C. for 20 minutes. This panel had a pencil hardness of F-H, a reverse impact resistance of less than 10 inch-pounds, methyl ethyl ketone rub resistance of greater than 200 and a cross-hatch adhesion loss of 0–5%. After immersion in water at 71°C. for 30 minutes, microblisters appeared and the pencil hardness remained the same.

EXAMPLE 16

A mixture is prepared of 20 parts of Polyether H, 20 parts of the same melamine composition used in Example 15, 0.4 part of p-toluene sulfonic acid, 0.1 part of dimethyl ethanol amine and 2.0 parts of water. Films were drawn down on Bonderite 1000 sheet steel panels in about a 1.0 mil thickness. The first panel was baked at 150°C. for 20 minutes and displayed a pencil hardness of 2B–3B, a reverse impact resistance of less than 10 inch-pounds, a methyl ethyl ketone rub resistance in excess of 200 and a cross-hatch adhesion loss of less than 10%. When immersed in water at 130°C. for 30 minutes, microblisters developed amounting to less than 10%

A second panel was baked at 175°C. for 20 minutes. This panel had a pencil hardness of B–2B, a reverse impact resistance of less than 10 inch pounds, a methyl ethyl ketone rub resistance in excess of 200 and a cross-hatch adhesion loss of less than 5%. After immersed in water at 71°C. for 30 minutes, microblisters developed in an amount of less than 10%.

The compositions of the present invention can be applied at a high solids from either an aqueous or an organic solution and in some instances blends of water and an organic solvent can be used. These coating systems produced films of excellent hardness, elasticity and also have good stability during storage. The present invention permits the formation of excellent stable coating compositions which give very good mechanical performance. It is the use of comparatively low molecular weight polyether polyol and comparatively low molecular weight cross-linking agents that permits the formulation of high solids coatings. The polyether resins used in this invention are hydroxyl bearing with an average functionality of 2 or more. The molecular weight of these polyether polyols may vary between about 250 and 2,000. These molecular weights are calculated molecular weights. These polyether polyols contain hydrophobic portions or moieties, principally of cyclic hydrocarbon structures, as well as hydrophilic portions or moieties derived from ethylene oxide consisting of —(CH$_2$CH$_2$—O—) units.

The polyether polyols used in the compositions of the present invention should contain from about 80 weight percent to about 20 weight percent of hydrophobic moieties and correspondingly from about 20 weight percent to 80 weight percent of hydrophilic groups consisting of —(CH$_2$CH$_2$—O—) units. It is preferred to use a polyol containing between about 70% to about 40% of the hydrophobic moieties and correspondingly from about 30% to about 60% of the hydrophilic groups or moieties consisting of —(CH$_2$CH$_2$—O—) units. The hydrophobic groups in the polyol will be derived from the aromatic bisphenols, the phenol-formaldehyde resins, hydrogenated bisphenol A, cyclohexane dimethanol, and the like. As mentioned before, the hydrophilic groups are contributed by the ethylene oxide. These polyether polyols are normally prepared by reacting a polyhydroxy compound with an alkylene oxide in the presence of a catalyst using superatmospheric pressure. The choice of catalysts is not critical. The catalysts useful in preparing these polyethers have been described in the preparation of non-ionic surfactants. After the reaction is completed, the catalyst is preferably precipitated out or removed by use of ion exchange resins. It has been found important to remove the last traces of catalyst because certain alkali or halogen containing catalysts can impair the cure behavior of the final coating system.

Like the polyol resins, the aminoplast cross-linking agents should have a comparatively low molecular weight when used in resinous form. It has been stated hereinabove that certain of these cross-linking agents are used in the monomeric form such as hexamethylolmelamine or hexakis(methoxymethyl) melamine. The average molecular weight of the resinous cross-linking agent should not exceed about 1,000.

If desired, a rosin-maleic anhydride adduct with an acid number of about 240 can be used in the compositions of the present invention because it is an excellent wetting and pigment dispersing agent. Titanium dioxide particularly requires the addition of a wetting agent to be uniformly dispersed in the polyether polyol aminoplast resin blend. This increase in wetting of the titanium dioxide pigment results in increased gloss and improved flow characteristic of the paint. Pigmented polyether amino cross-linked systems containing no wetting agent have poor gloss and are very difficult to apply. This maleic-rosin adduct, as used in some of the examples, is commercially available. However, other low molecular weight compatible high acid number compounds can be used. Examples of suitable compounds are styrene-maleic anhydride copolymers, styrene-acrylic acid polymers, styrene-maleic anhydride, Diels-Alder reaction products and alkylacrylic acid polymers. These low molecular weight products have an acid number of about 100 to 750 and are water soluble in the presence of an amine or alkali. The preferred molecular weight of these wetting agents is below 5,000. The level required to achieve wetting can be from 0.1 to 5% by weight based on the total weight of the composition.

In some instances, if for example uncleaned or dirty metal substrate is to be coated, it has been found to be advantageous to add a higher molecular weight acrylic resin to the polyether-amino cross-linking system as a flow control agent so as to improve the wetting of the metal substrate. The acrylic terpolymer used in some of the above examples has a molecular weight above 10,000 and contains acidic groups, preferably carboxyl groups. The acid number should be between 50 to 200.

The highly or fully alkylated aminoplast cross-linking agents containing polyether systems require an acid catalyst to reduce the cure temperature and decrease curing time. This catalyst is added as an amine salt to the paint system. During baking the amine dissociates and volatilizes, whereupon the system becomes reactive. If low temperature cure, i.e. below 250°F. (125°C.) is desired, the free unneutralized catalyst has to be used. Depending on the amount of the unneutralized acidic catalyst in the paint system, the shelf life of this composition can be reduced. Surprisingly it has been found possible to formulate acid catalyst containing systems which cure in less than 8 hours at room temperature. These paints have a shelf life, in catalyzed form, of more than 2 months. It is normally recommended if low temperature cure is desired to add the acid catalyst just before using the paint.

In Table I, set forth hereinbelow, a variety of catalysts tested in these systems are shown. Catalysts which can be used to cure this system at 125°–150°F. (52°–65°C.) have also shown room temperature cure.

For urea-formaldehyde resin containing polyether systems phosphoric acid was found to be a good catalyst. Hexakis(methoxymethyl)melamine has shown excellent cure with p-toluene sulfonic acid.

Table I

| | Catalyst Concentration Weight % on Binder Solids | |
|---|---|---|
| Cure Temperature | 125°F – 150°F | 250°F. – 300°F. |
| Catalyst 1010 (pTSA) | 5–10% | 1–3% |
| Nitric acid 70% | 2% | 0.5–1% |
| Sulfuric Acid | 2% | 0.1–0.5% |
| Phosphoric Acid | — | 0.4–3% |
| Zinc Chloride | — | 1–2% |
| Magnesium Bromide | — | 1–3% |
| Maleic anhydride | — | 2–4% |
| Phthalic anhydride | — | 2–4% |

The unalkylated amino cross-linking agents and the partially alkylated aminoplast cross-linking agents do not require an acid catalyst but if a faster cure is desired an acid catalyst may be used. In the place of acrylic polymers, nonionic water-soluble silicone surfactants can be used to increase wetting of the substrate and reduce film imperfections. Suitable nonionic silicone surfactants consist of a hydrophobic silane structure and a hydrophilic ethylene oxide chain.

The compatibility of the polyether polyol and the aminoplast cross-linking agent blend with water is determined by the water compatibility of the individual components. Ordinarily, if both components have a certain compatibility with water, the blend of the two components will have a similar compatibility with water. On the other hand, if the polyether polyol used in the blend is highly compatible with water and is readily dispersible in water, one could use with said polyol a comparatively water-insoluble hydrophobic cross-linking agent and still obtain a mixture which is water dilutable. By the same token, if a polyether polyol with limited water-solubility is used, a highly water-soluble aminoplast cross-linking agent will produce a blend with increased water compatibility. For most applications, it has been found to be advantageous to use polyether polyol-aminoplast cross-linking agent blends which are at least water dilutable up to the solids content required for ease of application. Sometimes, further dilution may result in precipitation of the blend. This selection of a blend with partially and limited water-solubility gives coating systems which, when applied as films, give improved water and corrosion resistance.

The hydrophobic moieties in the polyether polyol resins of the present invention are derived in part from aromatic or cycloaliphatic materials. These materials will contain in addition to the aromatic and cycloaliphatic rings, aliphatic hydrophobic moieties such as the isopropylidene group positioned between the two aromatic rings in bisphenol A or positioned between the two cycloaliphatic rings in the hydrogenated bisphenol A. Other hydrophobic aliphatic moieties may be present in the polyol system along with the aromatic or cycloaliphatic materials such as thos derived from propylene oxide, and the like.

I claim:

1. A composition of matter comprising a water-dilutable blend of (A) from about 10% to about 90% of a water-dilutable, polyether polyol resin, containing only carbon, hydrogen and oxygen atoms and optionally a halogen atom, having an average molecular weight between about 250 and about 2,000, having at least two alcoholic hydroxy groups, having from about 80% to about 20%, by weight, of hydrophobic moieties derived at least in part from aromatic or cycloaliphatic materials and correspondingly from about 20% to about 80%, by weight, of hydrophilic moieties consisting of —($CH_2CH_2$—O—) units and (B) correspondingly from about 90% to about 10%, by weight, of a compatible aminoplast cross-linking agent having an average molecular weight not greater than 1,000.

2. A composition according to claim 1 in which said cross-linking agent is alkylated with a $C_1$–$C_4$ alkanol.

3. A composition according to claim 1 in which (A) is present in an amount varying from about 40% to about 80% and (B) is present correspondingly in an amount varying from about 60% to about 20%.

4. A composition according to claim 1 in which (A) is a reaction product of 4,4'-methylene diphenol, propylene oxide and ethylene oxide.

5. A composition according to claim 1 in which (A) is a reaction product of 4,4'-isopropylidene diphenol and ethylene oxide.

6. A composition according to claim 1 in which (A) is a reaction product of a phenol-formaldehyde resin and ethylene oxide.

7. A composition according to claim 1 in which a solvent is present in an amount sufficient to provide a solids content of (A) and (B) in an amount between about 70% and 90%, by weight.

8. A composition according to claim 2 in which (B) is an alkylated $C_1$–$C_4$ urea formaldehyde cross-linking agent.

9. A composition according to claim 2 in which (B) is an alkylated $C_1$–$C_4$ melamine-formaldehyde cross-linking agent.

10. A composition according to claim 2 in which (B) is an alkylated $C_1$–$C_4$ benzoguanamine-formaldehyde cross-linking agent.

11. A composition according to claim 9 in which (B) is hexakis(methoxymethyl)melamine.

12. A composition according to claim 8 in which the cross-linking agent is methylated.

13. A composition according to claim 9 in which the cross-linking agent is methylated.

14. A composition according to claim 10 in which the cross-linking agent is methylated.

15. A composition according to claim 1 in which (A) is a reaction product of hydrogenated bisphenol A and ethylene oxide.

* * * * *

UNITED STATES PATENT OFFICE
CERTIFICATE OF CORRECTION

Patent No. 3,960,983     Dated     June 1, 1976

Inventor(s) Werner Josef Blank

It is certified that error appears in the above-identified patent and that said Letters Patent are hereby corrected as shown below:

Col. 6, line 60, delete "½.4/1.9" and insert therefor -- 1/2.4/1.9 -- .

Col. 8, line 47, delete "½.4/1.9" and insert therefor -- 1/2.4/1.9 -- .

Col. 9, lines 13 and 14, delete second "(methoxymethyl)melamine,".

Col. 10, line 26, delete "½.4/1.9" and insert therefor -- 1/2.4/1.9 -- .

Col. 10, line 56, delete "$1/_3$.5/2.0" and substitute therefor -- 1/3.5/2.0 -- .

Col. 11, line 10, delete "½.4/1.6" and substitute therefor -- 1/2.4/1.6 -- .

Signed and Sealed this

Seventh Day of December 1976

[SEAL]

Attest:

RUTH C. MASON
Attesting Officer

C. MARSHALL DANN
Commissioner of Patents and Trademarks